(12) United States Patent
Jadhav et al.

(10) Patent No.: US 10,939,387 B2
(45) Date of Patent: Mar. 2, 2021

(54) GRANULAR ADJUSTMENT OF ANTENNA POWER IN MULTI-RADIO SYSTEMS

(71) Applicant: Apple Inc., Cupertino, CA (US)

(72) Inventors: Digvijay Arjunrao Jadhav, San Jose, CA (US); Indranil S. Sen, Cupertino, CA (US); Jonathan C. King, Long Beach, CA (US); Mohit Narang, Cupertino, CA (US); Prathyusha Sangepu, Santa Clara, CA (US); Qiong Wu, Campbell, CA (US); Shrenik Milapchand, San Jose, CA (US); Vijay Gadde, San Jose, CA (US); Yu Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/381,946

(22) Filed: Apr. 11, 2019

(65) Prior Publication Data

US 2020/0107274 A1 Apr. 2, 2020

Related U.S. Application Data

(60) Provisional application No. 62/738,224, filed on Sep. 28, 2018.

(51) Int. Cl.
*H04W 52/26* (2009.01)

(52) U.S. Cl.
CPC ................................. *H04W 52/26* (2013.01)

(58) Field of Classification Search
CPC .. H04N 13/178; H04N 13/161; H04N 13/117; H04W 52/26; H04W 52/243; H04W 52/38; H04W 52/367; H04W 52/146
See application file for complete search history.

(56) References Cited

U.S. PATENT DOCUMENTS

| 8,909,282 B2 | 12/2014 | Ngai et al. |
| 8,995,938 B2 | 3/2015 | Ali et al. |
| 9,807,701 B2 | 10/2017 | Love et al. |

(Continued)

OTHER PUBLICATIONS

Pramod et al.; "Design considerations to calculate SAR in multiband MIMO antenna for mobile handsets"; 2016 IEEE International Conference on Wireless Communication, Signal Processing and Networking, Mar. 23, 2016; pp. 2434-2438 (XP032960097).

(Continued)

*Primary Examiner* — Yuwen Pan
*Assistant Examiner* — Fatuma G Sherif
(74) *Attorney, Agent, or Firm* — Fletcher Yoder PC (57) ABSTRACT

Multi-radio wireless network devices are capable of transmitting and/or receiving data from multiple radiofrequency (RF) networks at different bands. Total transmission power limitations may be in place due to, for example, safety reasons. As a result, active management of transmission power may be performed during simultaneous transmission in different bands and/or networks. In some embodiments, the management may take place on group-by-group basis and a network-by-network basis. Antennas may be grouped based on their relative positions and impact on radiation emitted by the devices.

20 Claims, 9 Drawing Sheets

(56) References Cited

U.S. PATENT DOCUMENTS

| | | | |
|---|---|---|---|
| 2012/0021707 A1* | 1/2012 | Forrester | H04W 52/281 |
| | | | 455/103 |
| 2016/0049978 A1 | 2/2016 | Mercer et al. | |
| 2016/0127006 A1 | 5/2016 | Majjigi et al. | |
| 2017/0111947 A1 | 4/2017 | Liu et al. | |
| 2018/0316379 A1* | 11/2018 | Chang | H04W 52/283 |
| 2019/0098553 A1* | 3/2019 | Koshy | H01Q 21/29 |
| 2019/0140716 A1* | 5/2019 | Frank | H04B 7/0639 |

OTHER PUBLICATIONS

International Search Report and Written Opinion for PCT Application No. PCT/US2019/048872 dated Nov. 25, 2019; 15 pgs.

* cited by examiner

GRANULAR ADJUSTMENT OF ANTENNA POWER IN MULTI-RADIO SYSTEMS

CROSS-REFERENCE TO RELATED APPLICATIONS

This application claims priority from and the benefit of U.S. Provisional Application Ser. No. 62/738,224, entitled "GRANULAR ADJUSTMENT OF ANTENNA POWER IN MULTI-RADIO SYSTEMS", filed Sep. 28, 2018, which is hereby incorporated by reference in its entirety for all purposes.

BACKGROUND

The present disclosure relates generally to wireless communication systems and, more specifically, to systems and methods for multi-radio systems having multiple antennas.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Certain electronic devices may exchange data and/or form networks using wireless communication systems. For example, laptops, mobile phones, and other similar devices may have wireless network interfaces that can connect to wireless networks. Communication with these networks may be performed using radio signals (e.g., radiofrequency (RF) signals). For safety reasons, limitations in the power of the emitted RF signals may be imposed. For example, the Federal Communications Commission (FCC) specifies a limit to the total amount of radiation emitted, specified as a Specific Absorption Rate (SAR) limit of 1.6 W/kg. This value may specify a total power generated by an antenna of an electronic device.

Some of these devices may be capable of connecting to multiple networks, such as cellular networks, wireless Ethernet networks, Bluetooth networks, and others. To connect to the multiple networks, each device may use a shared antenna or multiple antennas located in close proximity to each other. To satisfy the safety limitations on radiation emission (e.g., the SAR limit), the electronic devices may operate by scaling back the power in a first network when the electronic device joins a second network. Thus, such strategies may result in reducing signal quality or communication performance of at least one network (e.g., the first network) to maintain communication using the multiple networks.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Certain wireless electronic devices (e.g., multi-radio devices) may be capable of joining multiple radiofrequency (RF) networks using a subset of available antennas. In some situations, limits may be enforced to reduce the emitted radiation from an electronic device. As usage of each network may emit radiation, simultaneous connection between the electronic device and multiple networks may employ active power management to satisfy the limits of the emitted radiation.

Embodiments described herein are directed to multi-radio devices, and methods of operation thereof, in which the management of the transmission powers is based on the network and/or the antenna location. In some embodiments, the location information may be encoded in messages that distinguish groups (e.g., group-by-group basis management of power). In some embodiments, the location information may be encoded in messages that distinguish individual antennas (e.g., antenna-by-antenna basis management of power). Combination of group-by-group and antenna-by-antenna management may also be employed for different networks.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain electronic devices may access wireless networks to exchange data with other electronic devices. Multi-radio devices are electronic devices that may connect to multiple wireless networks simultaneously. For example, certain electronic devices may simultaneously connect to multiple wireless networks, which may include cellular networks (e.g., network using 4G standards such as Long Term Evolution or LTE, 5G standards such as New Radio or 5G NR) and/or connectivity networks (e.g., IEEE 802.3 or Wi-Fi, Bluetooth). Each of the connections may employ one or more antennas that establish radio frequency (RF) connections by emitting and/or receiving RF signals.

Some of these electronic devices, such as smartphones, wearable devices, or tablets, may be operated close to the human body. For safety reasons, limitations on the amount of radiation emitted by an electronic device may be imposed. For example, certain regulations impose a maximum specific absorption rate (SAR) for electromagnetic power. In multi-radio devices that connect to multiple networks by a shared antenna or multiple antennas, the radiation power associated with each network may have an additive effect on the total radiation emitted. Therefore, in such systems, changes to the power level for one network may accompany a reduction in power level for a second network. As an example, when a cell phone that is connected to Bluetooth network and a cellular network initiates a call, the power used to connect to the cellular network may be increased to improve the call transmission. In this example, in order to obey SAR specifications, the cell phone may reduce the power used to connect to the Bluetooth network.

As electronic devices increase in size and/or operate with multiple antennas, the network-based adjustment may be excessively conservative. For example, a large device having two separated antennas located at opposite ends of the device for two different network. Such device may satisfy total radiation limits (e.g., SAR limits) without substantial reduction in the amount of radiation emitted from each antenna. Embodiments describe herein are related to multi-radio electronic devices, and methods of operation thereof, that enable a more granular control of the transmission power. These embodiments may take into account the localization of the antennas as well as the network to perform the power adjustments in a manner that preserves the safety specifications with an improved overall performance.

Figure 1:
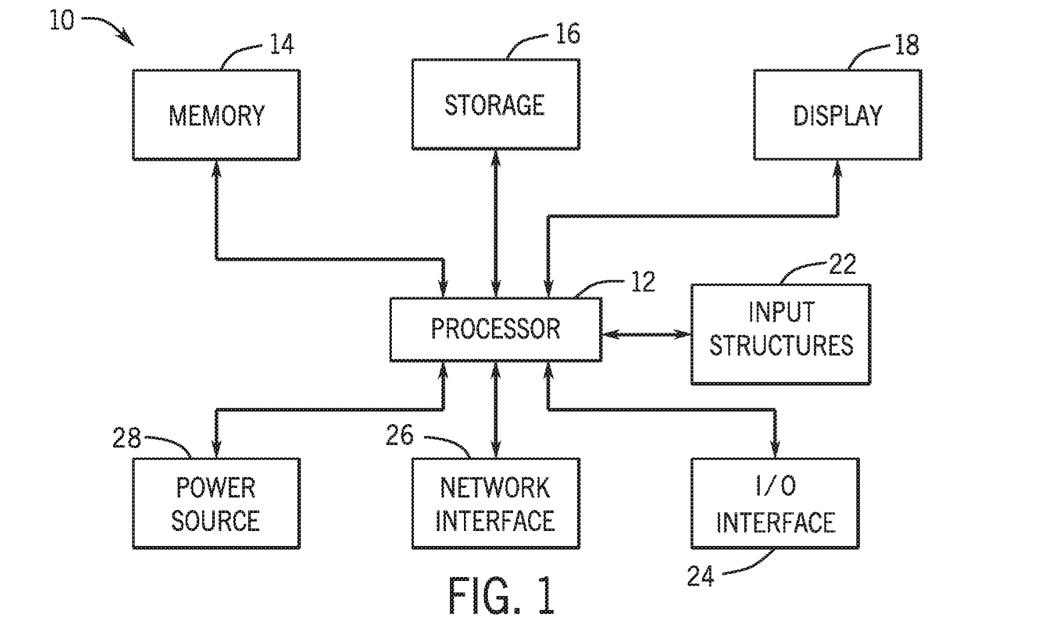
FIG. 1 is a block diagram of a multi-radio electronic device that includes a granular transmission power in a radiofrequency (RF) communication system, in accordance with an embodiments of the present disclosure.

With the foregoing in mind, there are many suitable multi-radio electronic devices that may benefit from the embodiments for granular power control described herein. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
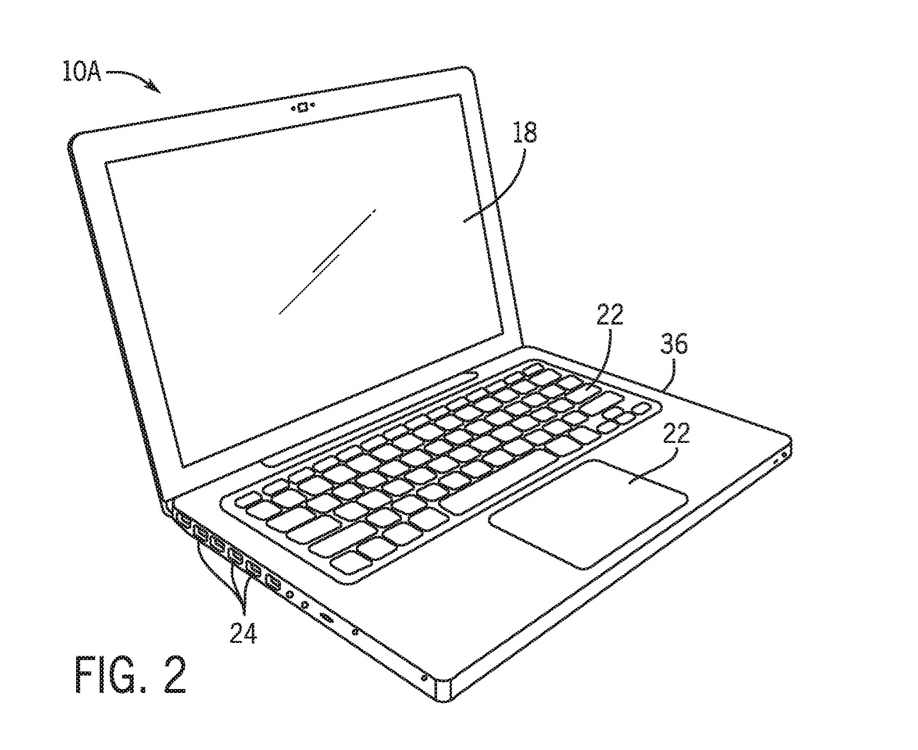
FIG. 2 is a perspective view of a notebook computer representing an embodiment of the electronic device of FIG. 1.
Figure 3:
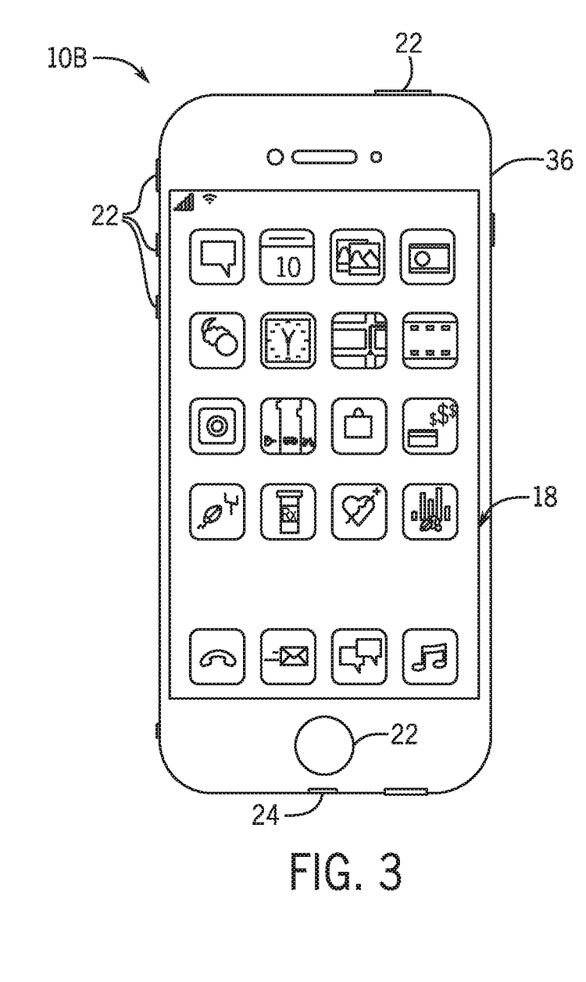
FIG. 3 is a front view of a hand-held device representing another embodiment of the electronic device of FIG. 1.
Figure 4:
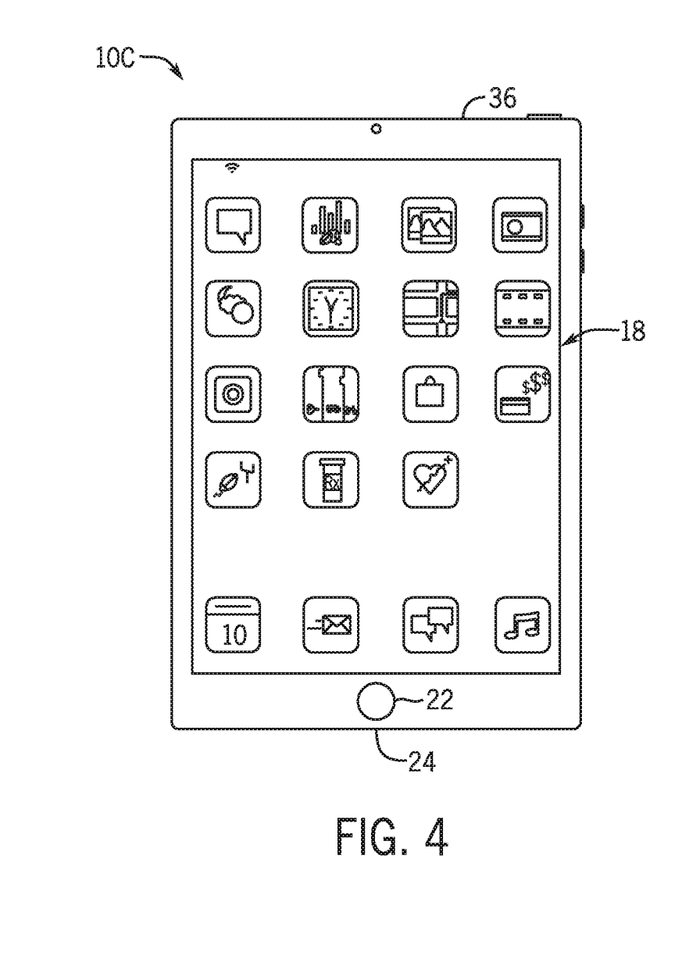
FIG. 4 is a front view of another hand-held device representing another embodiment of the electronic device of FIG. 1.
Figure 5:
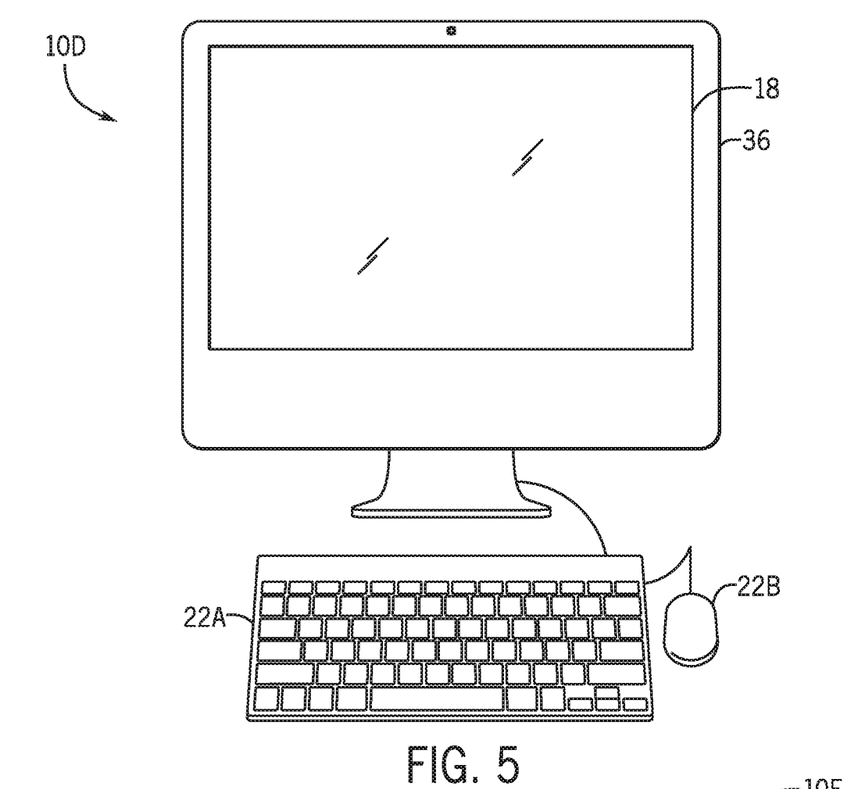
FIG. 5 is a front view of a desktop computer representing another embodiment of the electronic device of FIG. 1.
Figure 6:
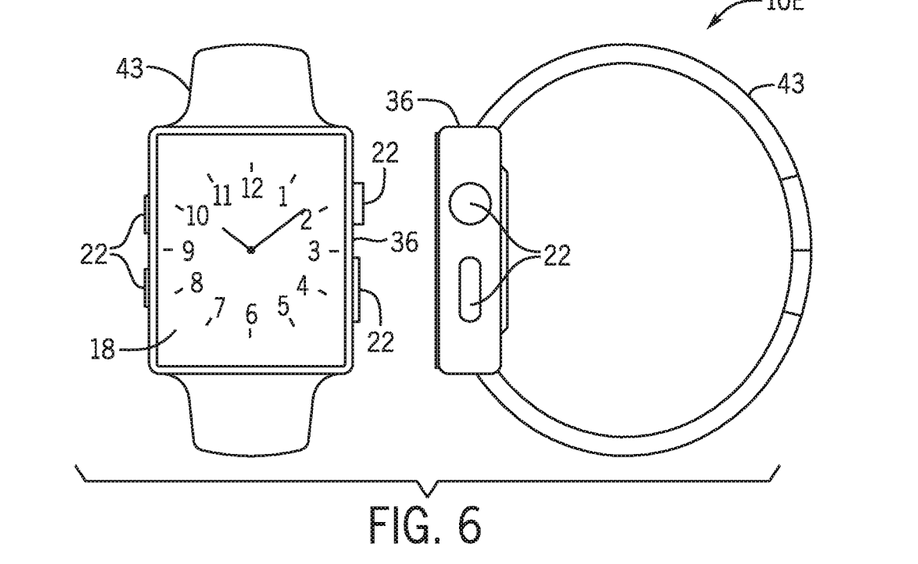
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, universal mobile telecommunication system (UMTS), 4th generation (4G) cellular network, long term evolution (LTE) cellular network, or long term evolution license assisted access (LTE-LAA) cellular network, 5th generation (5G) cellular network, and/or 5G New Radio (5G NR) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. For example, network interfaces 26 may be capable of joining multiple networks, and may employ multiple antennas to that end. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices 22, such as the keyboard 22A or mouse 22B, which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
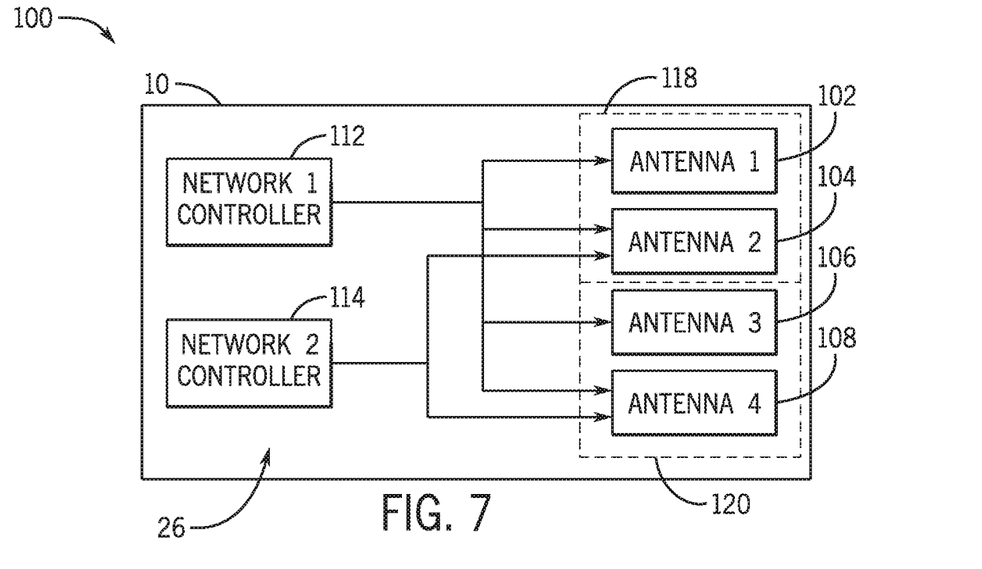
FIG. 7 is a block diagram of a multi-radio electronic device having multiple antennas and multiple network controllers, in accordance with embodiments of the present disclosure.

With the foregoing in mind, the block diagram 100 of FIG. 7 illustrates an example of the electronic device 10 that may have a wireless network interface 26. The illustrated network interface 26 may have multiple antennas 102, 104, 106, and 108. The antennas 102, 104, 106, and 108 may be controlled or operated by network controllers 112 and 114. The network controller 112 may be used to join a network and the network controller 114 may be used to join a different network. In the illustrated example, the network controller 112 may send RF signals via antennas 102, 104, 106, and 108 and the network controller may send RF signal via antennas 104 and 108.

Antennas 102 and 104 may belong to a first group of antennas 118 and antennas 106 and 108 may belong to a second group of antennas 120, based on a location in the electronic device 10. Two antennas may be placed in a common group if the distance between the antennas is within a threshold distance. For example, a group may include a set of antennas disposed in a specific region of the electronic device 10 (e.g., the top, the bottom, a side, a front end, a back end, a specific edge). In some embodiments, two antennas may belong to the same group if the radiation emitted from the first antenna and the radiation emitted from the second antenna may potentially lead to a superposition radiation that can exceed a SAR threshold. In additional or alternative embodiments, antennas may belong in the same group if the separation (distance) between the antennas is less than a threshold distance (e.g., a minimum distance). The threshold distance may be calculated based on a simulation of the radiation pattern, an analytical calculation of the radiation power, and/or a SAR to peak location separation ratio (SPLSR). The calculation of the threshold distance (e.g., using the SPLSR) may take into account the power emitted by the antennas. As discussed herein, two antennas may have a separation distance that satisfies the SPLSR when the separation distance provides a SPLSR that is in accordance with healthy requirements. Generally, antennas may be assigned to a common group if the use of one of the antennas may require an adjustment in the use of another antenna to satisfy radiation limitations.

As discussed above, antennas may be classified as belonging to similar groups based on a joint impact on safety radiation limits. The use of such grouping may allow a more flexible management of the RF power associated with different networks. For example, as discussed above, management of the power of transmission may take place on a network-based level in conventional systems. As an example, in a conventional embodiment similar to the network device 26 of FIG. 7, if the power of the network controller 114 is increased to establish a stronger link, the power of network controller 112 may be decreased (e.g., "backed-off") without regard to the impact of the power of network controller 112 on the total radiation emitted or SAR limits. By contrast, in the network device 26 of FIG. 7, network controller 114 may selectively choose using the antenna 104 and the antenna 108, and network controller 112 may selectively decrease the power based on the grouping, while still limiting radiation emission within SAR limits.

Figure 8:
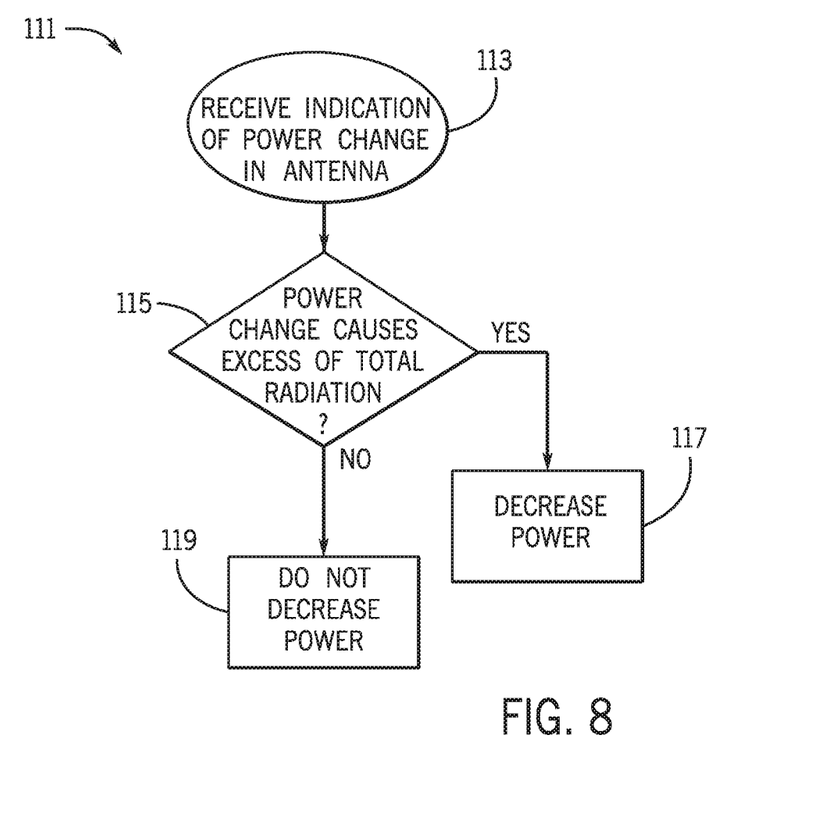
FIG. 8 is a flow chart for a method that performs granular management of transmission power, in accordance with embodiments of the present disclosure.

The flow chart in FIG. 8 illustrates a method 111 for granular control of the power of antennas in a device such as, for example, device 10 of FIG. 7. Method 111 may have a process block 113, in which a power of a first antenna of the device 10 may be changed (e.g., increased or decreased). Process block 113 may be triggered as an event. Following process block 113, in a decision block 115, the circuitry may determine if the change in the power of a first antenna may, in combination with the other antennas, cause the electronic device to exceed a radiation emission limit. Such determination may be made based in an individual level (e.g., the determination of the impact of the impact of the first antenna on each other antenna) and/or in a group-by-group level (e.g., the determination of the impact of the first antenna on groups of antenna. The determination may be made based on the location of the antenna, a group of the antenna, and/or separation between the antennas. In some embodiments, the determination may be based dynamically (e.g., in processing circuitry). In alternative or additional embodiments, the determination may be performed by employing a look-up table, such as the one exemplified by Table 1.

TABLE 1

Look-up table for network device 26 of FIG. 7.

| Selection by Network Controller 114 | Power for Antenna 102 | Power for Antenna 104 | Power for Antenna 106 | Power for Antenna 108 |
|---|---|---|---|---|
| Antenna 104 | Decreased | Decreased | Unchanged | Unchanged |
| Antenna 108 | Unchanged | Unchanged | Decreased | Decreased |

As illustrated in Table 1, when the network controller 114 selects antenna 104, network controller 112 may decrease the transmission power for antennas 102 and 104, as they belong to the same group of antennas 118. The decrease in the transmission power may allow compliance of the electronic device with radiation limit specifications (e.g., SAR limits, SPSLR limits). Due to the use of the grouping discussed above, the transmission power for antennas 106 and 108 may remain unchanged without exceeding safety specifications. Similarly, as illustrated in Table 1, when the network controller 114 selects antenna 108, network controller 112 may decrease the transmission power for antennas 106 and 108 without changing the transmission power of antennas 102 and 104. The look-up table may be stored in a memory of the network device 26 (e.g., in the front-end circuitry) or in a memory of the electronic device 10. In some embodiments, some antennas may have dedicated front-end modules and, in such embodiments, the look-up table may be a distributed look-up table across the distinct front-end modules. For example, antennas 102, 104, 106, and 108 may have dedicated power control circuit. In such system, a power control circuit associated with antenna 102 stores a portion of the look-up table corresponding to the first column of Table 1, a power control circuit associated with antenna 104 stores a portion of the look-up table corresponding to the second column of Table 1, a power control circuit associated with antenna 106 stores a portion of the look-up table corresponding to the third column of Table 1, and a power control circuit associated with antenna 108 stores a portion of the look-up table corresponding to the fourth column of Table 1.

Commands to the antennas and/or to the transceivers may be transmitted via a communication interface using a wireless power protocol to a power controller. In some embodiments, the communication interface may provide information by providing a message format that includes bits that encode which antenna and/or which group is being activated, as detailed below. In some embodiments, the bits may be provided by extending the number of bits in a Wireless Communication Interface 2 (WCI2) message. A power controller in the network controller (e.g., 112, 114), in transceiver circuitry, and/or antenna circuitry may increase or decrease power by receiving the message and responding in accordance to the above-discussed look-up table. In some embodiments, the look-up table may be used to generate the message sent to the transceiver circuitry and/or the antenna (e.g., 102, 104, 106, 108). Management of the power in a particular antenna that is associated with a particular network may be performed by an amplifier in the antenna, an amplifier in the front-end module coupled to the antenna, and/or in the transceiver circuitry coupled to the antenna.

Figure 9:
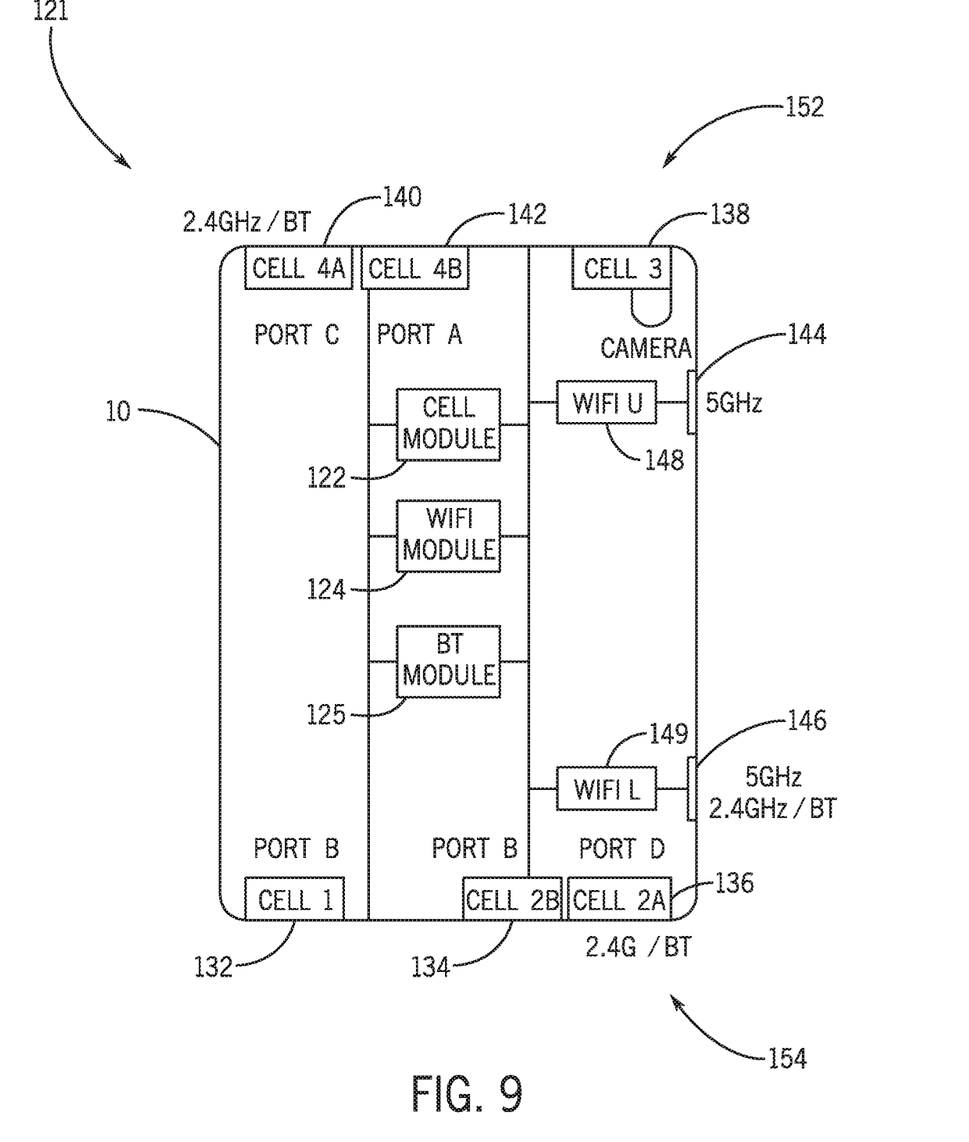
FIG. 9 is a schematic diagram of a multi-radio electronic device with at least 8 antennas that enable joining at least three types of RF networks, in accordance with embodiments of the present disclosure.
Figure 10:
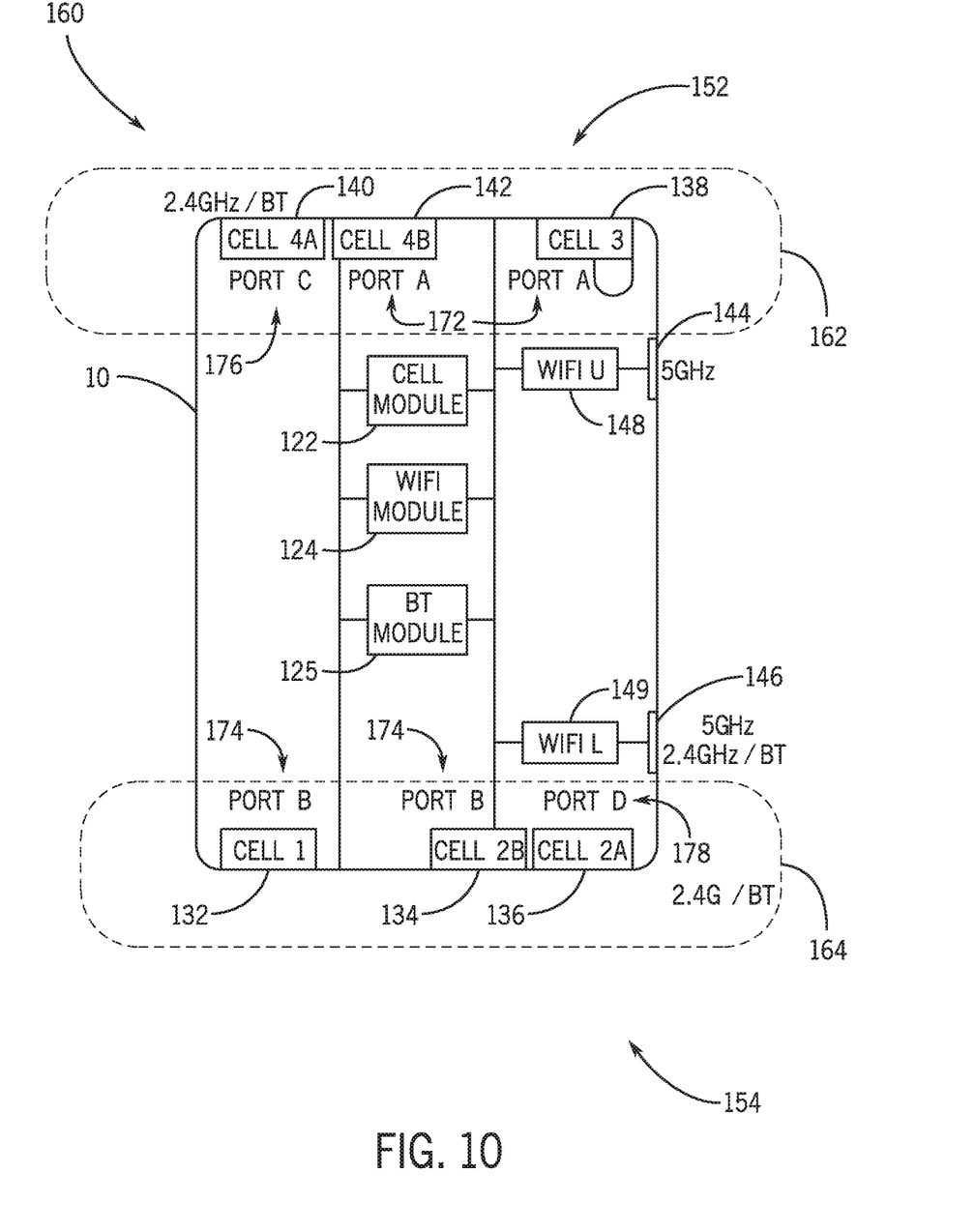
FIG. 10 is a schematic diagram of the multi-radio electronic device of FIG. 9 that implements group-by-group management of transmission power, in accordance with embodiments of the present disclosure.

Another example of the systems and methods described herein is illustrated with the multi-radio electronic device 10 of FIG. 9, illustrated in diagram 121. The illustrated multi-radio electronic device 10 may be able to connect to at least three different networks. To that end, the multi-radio electronic device 10 may include a cellular network module 122, a Wi-Fi network module 124, and/or a Bluetooth module 125. The multi-radio electronic device 10 may also have multiple antennas that may service different networks and/or bands. For example, antennas 132, 134, 136, 138, 140, and 142 may be used to join a cellular network. Antennas 144 and 146 may be used to access a 5 GHz Wi-Fi network. Antennas 136, 140, and 146 may be used to access a 2.4 GHz Wi-Fi network and/or a Bluetooth network. The electronic device may have dedicated transceivers 148 and 149 used to access the 5 GHz Wi-Fi network. Transceiver 148 may be used to facilitate control of the antenna 144 and transceiver 149 may be used to facilitate control of the antenna 146.

Figure 11:
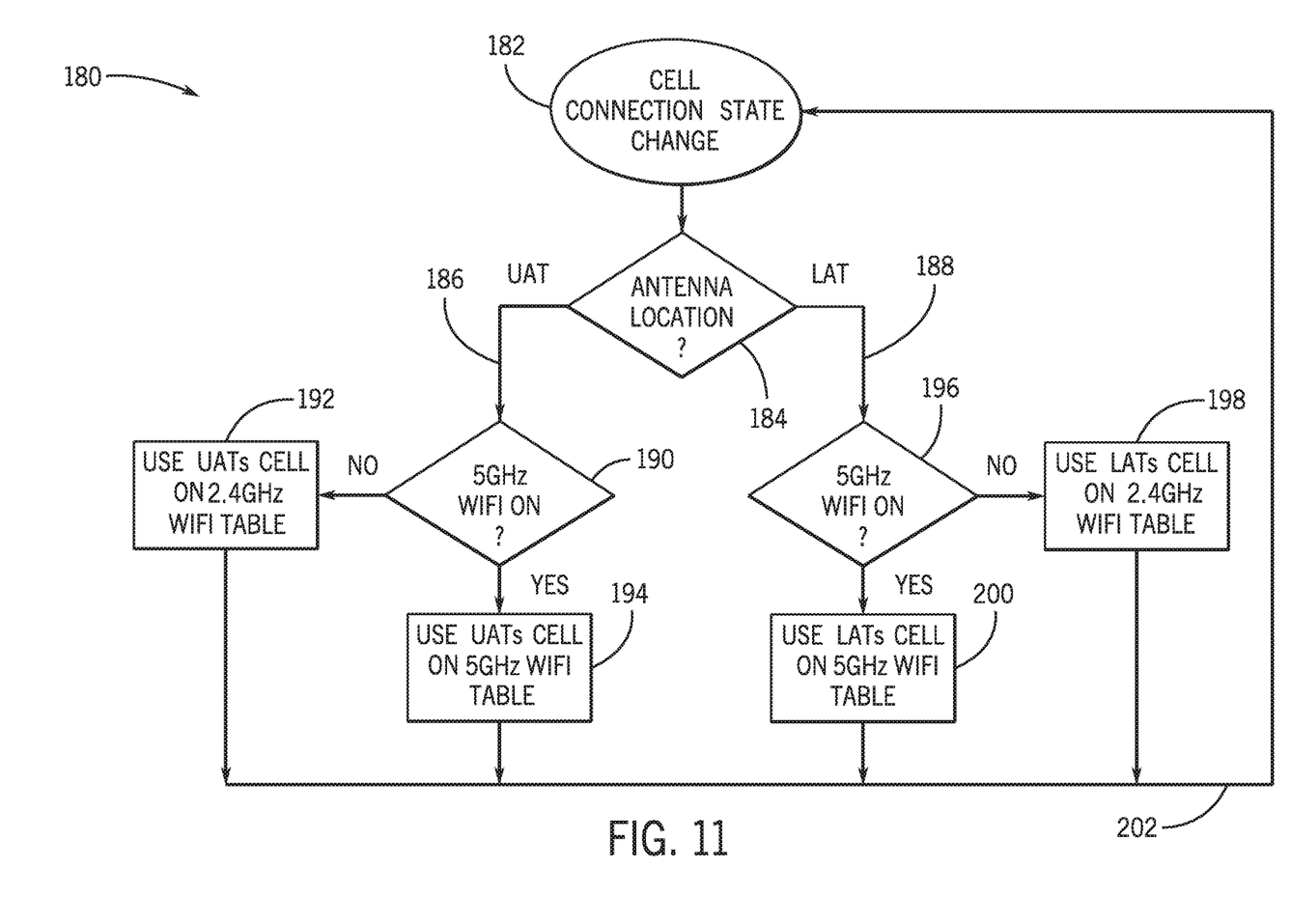
FIG. 11 is a flow chart for a method that performs group-by-group management of transmission power, in accordance with embodiments of the present disclosure.
Figure 12:
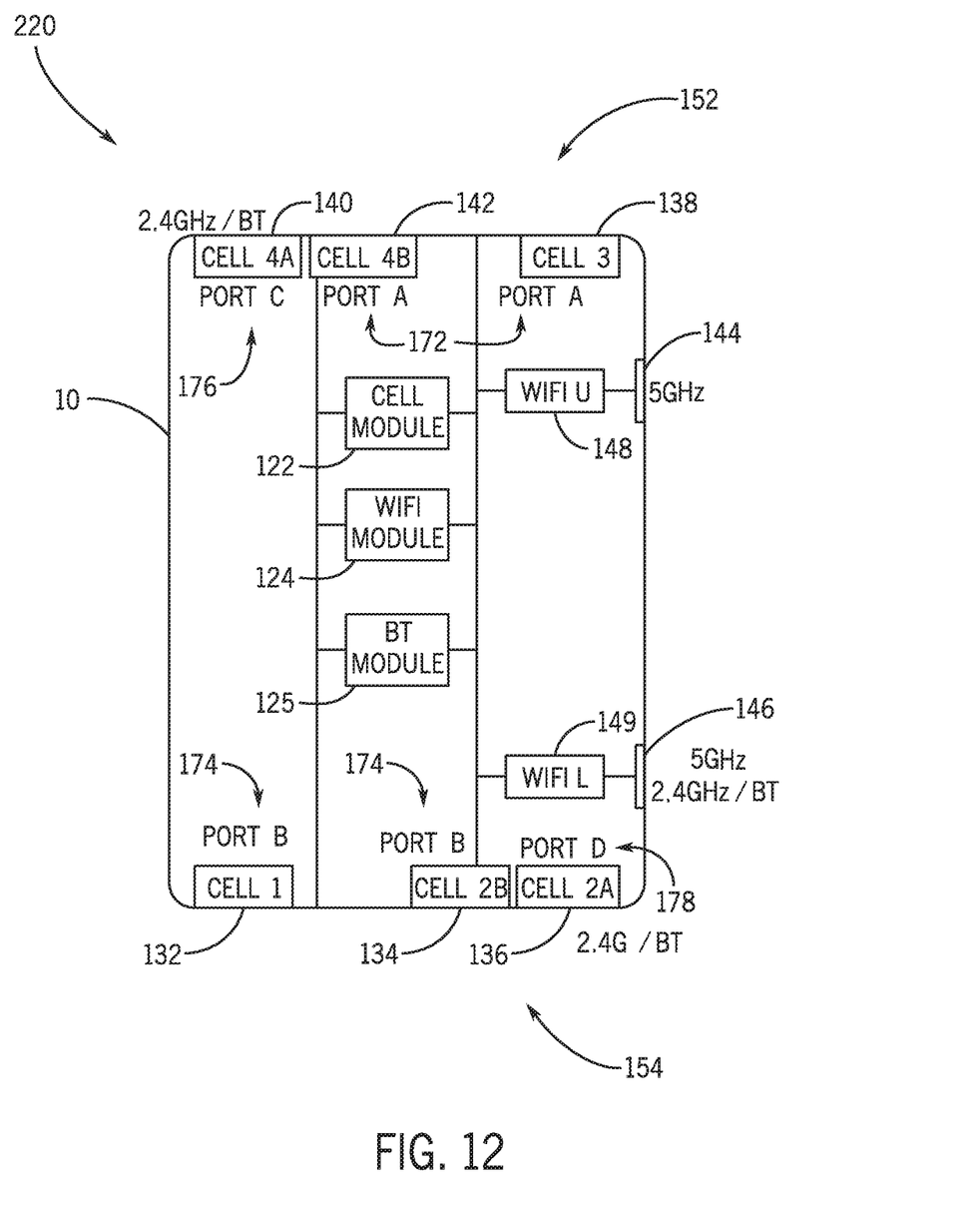
FIG. 12 is a schematic diagram of the multi-radio electronic device of FIG. 9 that implements antenna-by-antenna and/or group-by-group management of transmission power, in accordance with embodiments of the present disclosure.

The multi-radio electronic device 10 of FIG. 9 is illustrated as an example of an embodiment and may represent a mobile phone, a portable media device, a wearable device, a laptop computer, and/or a tablet computer. As such, implementations of embodiments of the multi-radio electronic device 10 may have different dimensions. For example, the multi-radio electronic device may be a wearable device with a dimension of about 30 mm×30 mm or a tablet computer of about 160 mm×250 mm. As such, the above-discussed grouping of antennas that are described in the discussion of the electronic device in FIGS. 8, 9, and 11 are illustrative and are provided herein to discuss the implementation of the selective power adjustment described herein.

In the descriptions of FIGS. 9, 10, 11, and 12, the described adjustments to the power in the antennas are performed in response to changes in the power of antennas used to join cellular networks. Embodiments in which the adjustments are performed in response to changes in power of antennas used to join other networks may be implemented based on the disclosures described herein. It should also be noted that, in some embodiments, the presently disclosed electronic devices 10 may include multi-band cellular devices (i.e., the devices may be capable of joining cellular networks in multiple bands). For example, certain devices may be capable of joining networks in multiple cellular bands such as 380 MHz, 410 MHz, 450 MHz, 480 MHz, 700 MHz, 710 MHz, 750 MHz, 800 MHz, 810 MHz, 850 MHz, 900 MHz, 1,500 MHz, 1,700 MHz, 1,800 MHz, 1,900 MHz, 2100 MHz, 2600 MHz, or 3500 MHz bands. In such multi-band cellular devices, certain antennas may be dedicated or optimized to a subset of all the available bands. As a result, the change in the power of a particular cellular antenna may be performed in response to the band of the network being joined. Similarly, certain devices may be capable of joining Wi-Fi networks using the 2.4 GHz band or the 5 GHz band, and the antennas used to perform Wi-Fi operations may be chosen based on the type of connection band (e.g., the 2.4 GHz band or the 5 GHz band).

As discussed above, the transmission power for antennas and/or connecting to associated networks may be adjusted in response to changes in the transmission power of a cellular antenna. The antennas and network connections of the multi-radio electronic device 10 may be controlled at a group level, as illustrated in the diagram 160 of FIG. 10. In particular, the electronic device 10 of FIG. 10 may have antennas arranged in a manner similar to the electronic device 10 of FIG. 9. The antennas 132, 134, 136, 138, 140, 142, 144, and 146 in the electronic device 10 of FIG. 10 may be assigned to two groups: an upper antenna group 162 near the top 152 of the electronic device 10 and a lower antenna group 164 near a bottom 154 of the electronic device 10. The upper antenna group 162 may include antennas 138, 140, 142, and 144 and the lower antenna group 164 may include antennas 132, 134, 136, and 146. In some embodiments of the multi-radio electronic device 10, such as a cell phone embodiment, the upper antenna group 162 may be located near the forehead a user holding the cell phone and the lower antenna group 164 may be located near the chin of the user.

In order to address the groups, antennas may be assigned to ports. Ports may be used to distinguish location and network capability for an antenna. The multi-radio electronic device 10 of FIG. 10 may have ports 172, 174, 176, and 178. Port 172 may control antennas 138 and 142 in the upper antenna group 162 that are only used for joining cellular networks and port 174 may control antennas 132 and 134 in the lower antenna group 164 that are only used for joining cellular networks. Port 176 may control the antenna 140 in the upper antenna group 162 that may be used for joining cellular networks, Bluetooth networks, and/or 2.4 GHz Wi-Fi networks. Port 178 may control the antenna 136 in the lower antenna group 164 that may be used for joining cellular networks, Bluetooth networks, and/or 2.4 GHz Wi-Fi networks. As the antennas are divided in two groups 162 and 164, the message indicating the location of an antenna may be encoded using a single bit. In some embodiments, the antenna location message may be provided by employing WCI2 protocol with one extra bit. More generally, an embodiment that includes N groups may employ a message encoded using an integer number of bits greater or equal to log 2N. These bits may be added to a WCI2 message.

As discussed above, the antennas may be managed on a group level based on a joint impact on safety radiation limits. The use of such grouping may allow a more flexible management of the RF power associated with different networks. As such, an increase to the power of one antenna of the upper antenna group 162 may be accompanied by reduction in the transmission power (e.g. "backing-off") of other antennas in the upper antenna group 162. By contrast, an increase to the power of an antenna of the antenna group 162 does not necessarily need to be accompanied by a reduction in the transmission power of antennas in the lower antenna group 164, as a separation between the antennas may satisfy limits (e.g., SAR limits, SPSLR ratio). The flowchart of FIG. 11 illustrates a method 180 to adjust the power of the antennas associated with Wi-Fi operations based on a change to the power of an antenna used in a cellular connection, to satisfy the above-discussed criteria. The method 180 of FIG. 11 is described in association with the diagram 160 of FIG. 10 and look-up tables described in Tables 2 and 3.

Method 180 may be performed iteratively in response to an event 182 associated with a change in the connection state of the cell. The event 182 may be triggered by cell phone events such as an initiation of a call, transmission or reception of a message over cellular network, changes in the connected cellular connection tower, and/or changes in the cellular band. In decision block 184, the location or the group of the antenna associated with the change in event 182 is determined. If the adjusted cellular antenna is in the upper antenna ("UAT") group 162 (e.g., antennas 138, 140, and/or 142), branch 186 may be applied. If the adjusted cellular antenna is in the lower antenna ("LAT") group 164 (e.g., antennas 132, 134, and 135), branch 188 may be followed. This decision may be implemented by using a bit in the message (e.g., a WCI2 message with an additional bit). For example, in some embodiments, group 162 may be associated with a bit 0 and group 164 may be associated with bit 1.

In branch 186, the decision block 190 may be followed to determine whether the band of the Wi-Fi connection is a 2.4 GHz band or a 5 GHz band. In some embodiments, the 5 GHz band may be used when the Bluetooth connection is active. If the 5 GHz is not used and, thus, the 2.4 GHz connection is used, antennas that may cause the total radiation to exceed the radiation limits may be scaled back. A look-up table, such as Table 2 may be used in process block 192 to determine which antennas should be scaled back and which antennas should have their power preserved (as opposed to more conventional techniques of scaling back power to all other antennas). If the 5 GHz is used, antennas that may cause the total radiation to exceed the radiation limits may be scaled back. A look-up table such as Table 3 may be used in process block 194 to determine which antennas should be scaled back and which antennas should have their power preserved (as opposed to more conventional techniques of scaling back power to all other antennas). Similarly, in branch 188, the decision block 196 may be followed to determine whether the band of the Wi-Fi connection is a 2.4 GHz band or a 5 GHz band. If the 2.4 GHz connection is used, a look-up table based on Table 2 may be used in process block 198. If the 5 GHz is used, a look-up table based on Table 3 may be used in process block 200.

TABLE 2

Look-up table for 2.4 GHz Wi-Fi, as described in method 180 of FIG. 11.

| Activated Group Message | Wi-Fi Power for Antenna 140 | Wi-Fi Power for Antenna 136 | Wi-Fi Power for Antenna 146 |
|---|---|---|---|
| Increase in UAT Group 162 | Decreased | Unchanged | Unchanged |
| Increase in LAT Group 164 | Unchanged | Decreased | Decreased |

TABLE 3

Look-up table for 5 GHz Wi-Fi, as described in method 180 of FIG. 11.

| Activated Group Message | Power for Antenna 146 | Power for Antenna 144 |
|---|---|---|
| Increase in UAT Group 162 | Unchanged | Decreased |
| Increase in LAT Group 164 | Decreased | Unchanged |

In some embodiments, the control of transmission power of the antennas may be achieved in a more granular level, by controlling the transmission power of the antennas individually. An embodiment of multi-radio electronic device 10 that enables single-antenna controllable transmission power level is illustrated in diagram 220 of FIG. 12. The electronic device 10 of FIG. 12 may have antennas and Wi-Fi modules arranged in a manner similar to the electronic device 10 of FIG. 9. In the embodiment illustrated in diagram 220, cellular connections may employ any of the 6 antennas 132, 134, 136, 138, 140, and 142. As such, encoding of the antenna location message may employ three bits. More generally, an embodiment that include N antennas may employ a message encoded using an integer number of bits greater or equal to log 2N.

Figure 13:
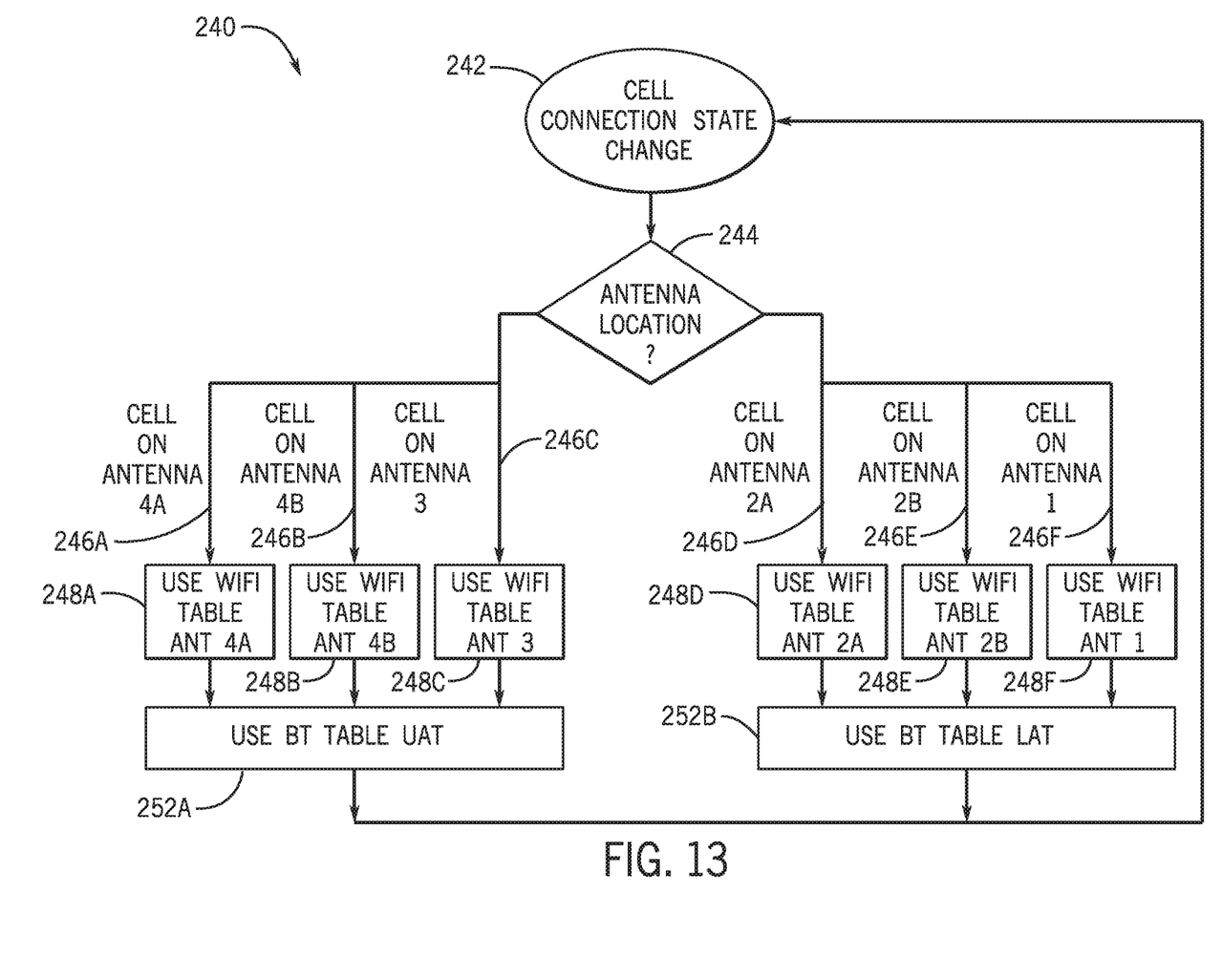
FIG. 13 is a flow chart for a method that performs antenna-by-antenna and/or group-by-group management of the transmission power, in accordance with embodiments of the present disclosure.

As discussed above, the transmission power of the antennas may be managed on a granular level based on joint impact of antennas on safety radiation limits. The use of such grouping may allow a more flexible management of the RF power associated with different networks. As such, an increase to the power of an antenna may be accompanied by reduction in the transmission power (e.g. "backing-off") in antennas that may cause a joint transmission that may cause the total transmission of the device to exceed radiation limits. However, an increase to the power of an antenna does not necessarily need to be accompanied by a reduction in the transmission power of antennas that are sufficiently separated and, thus, satisfy limits (e.g., SPSLR ratio). The flowchart of FIG. 13 illustrates a method 240 to adjust the power of the antennas associated with Wi-Fi operations based on a change to the power of an antenna used in a cellular connection, as discussed above. The method 240 of FIG. 13 is described in association with the diagram 220 of FIG. 12 and look-up tables described in Tables 4 and 5.

Method 240 of FIG. 13 may be performed iteratively in response to an event 242 associated with a change in the connection state of the cell. The event 242 may be triggered by cell phone events such as an initiation of a call, transmission or reception of a message over cellular network, changes in the connected cellular connection tower, and/or changes in the cellular band. In decision block 224, the antenna associated with the change in event 242 is determined. In the example, antenna 140 is associated with branch 246A, antenna 142 is associated with branch 246B, antenna 138 is associated with branch 246C, antenna 136 is associated with branch 246D, antenna 134 is associated with branch 246E, and antenna 132 may be associated with branch 246F. Each branch may cause the Wi-Fi antennas to respond in accordance with a look-up table such as that of Table 4 or Table 5. Look-up tables such as Table 4 and Table 5 may be used in process blocks 248A-E to determine which antennas should be scaled back and which antennas should have their power preserved (as opposed to more conventional techniques of scaling back power to all other antennas). This decision may be implemented by verifying the additional three bits in the message (e.g., a WCI2 message with three additional bits). For example, antenna 138 may be associated with bits 001, antenna 140 may be associated with bits 010, antenna 142 may be associated with bit 011, antenna 132 may be associated with bits 100, antenna 136 may be associated with bits 101, and antenna 134 may be associated with bits 110.

TABLE 4

Look-up table for 2.4 GHz Wi-Fi, as described in method 240 of FIG. 13.

| Activated Antenna Message | Wi-Fi Power for Antenna 140 | Wi-Fi Power for Antenna 136 | Wi-Fi Power for Antenna 146 |
|---|---|---|---|
| UAT Antenna 3 (138) | Unchanged | Unchanged | Unchanged |
| UAT Antenna 4A (140) | Decreased | Unchanged | Unchanged |
| UAT Antenna 4B (142) | Decreased | Unchanged | Unchanged |
| LAT Antenna 1 (132) | Unchanged | Unchanged | Unchanged |
| LAT Antenna 2A (136) | Unchanged | Decreased | Decreased |
| LAT Antenna 2B (134) | Unchanged | Decreased | Decreased |

TABLE 5

Look-up table for 5 GHz Wi-Fi, as described in method 240 of FIG. 13.

| Activated Antenna Message | Power for Antenna 146 | Power for Antenna 144 |
|---|---|---|
| UAT Antenna 3 (138) | Unchanged | Decreased |
| UAT Antenna 4A (140) | Unchanged | Unchanged |
| UAT Antenna 4B (142) | Unchanged | Unchanged |
| LAT Antenna 1 (132) | Unchanged | Unchanged |
| LAT Antenna 2A (136) | Decreased | Unchanged |
| LAT Antenna 2B (134) | Unchanged | Unchanged |

In some embodiments, a combined approach may be used for granular adjustment. For example, a three-network device may have one network circuitry respond to a change in a second network circuitry in an antenna-by-antenna basis and have a third network circuitry respond to the change in the second network circuitry in a group-by-group basis. For example, the method 240 of FIG. 13 may be adapted to perform adjustments to the power of antennas associated with Bluetooth operations based on the state of the antennas used in a cellular connection and Wi-Fi connection, in order to satisfy limits for total radiation. An example of a lookup table for Bluetooth circuitry is represented in Table 6. A look-up table such as Table 6 may be used in process block 252A-B to determine which antennas should be scaled back and which antennas should have their power preserved (as opposed to more conventional techniques of scaling back power to all other antennas). The Bluetooth operation may be performed during a process block 252A, following block processes 248A, 248B, or 248C or during a process block 252B, and following block processes 248D, 248E, or 248F which may take place in a group-by group basis. The Bluetooth circuitry may extract the antenna information from the three additional bits, as discussed above. Moreover, the management of power for Bluetooth operations may be performed by employing ports (e.g., ports 172, 174, 176, and 178), as discussed above.

TABLE 6

Look-up table for Bluetooth, as described in method 240 of FIG. 13.

| Activated Cellular Antenna Message | Wi-Fi 5 GHz State | BT Power for Antenna 140 | BT Power for Antenna 136 | BT Power for Antenna 146 |
|---|---|---|---|---|
| UAT Antenna 3 (138) | On | Decreased | Unchanged | Unchanged |
| UAT Antenna 4A (140) | On | Decreased | Unchanged | Unchanged |
| UAT Antenna 4B (142) | On | Decreased | Unchanged | Unchanged |
| LAT Antenna 1 (132) | On | Unchanged | Decreased$^1$ | Decreased$^1$ |
| LAT Antenna 2A (136) | On | Unchanged | Decreased$^1$ | Decreased$^1$ |
| LAT Antenna 2B (134) | On | Unchanged | Decreased$^1$ | Decreased$^1$ |
| UAT Antenna 3 (138) | On | Decreased | Unchanged | Unchanged |
| UAT Antenna 4A (140) | Off | Decreased | Unchanged | Unchanged |
| UAT Antenna 4B (142) | Off | Decreased | Unchanged | Unchanged |
| LAT Antenna 1 (132) | Off | Unchanged | Decreased$^2$ | Decreased$^2$ |
| LAT Antenna 2A (136) | Off | Unchanged | Decreased$^2$ | Decreased$^2$ |
| LAT Antenna 2B (134) | Off | Unchanged | Decreased$^2$ | Decreased$^2$ |

[1,2] The decrease when the 5 GHz antenna is high, indicated by superscript 1 may be higher than the decrease when the 5 GHz is low, indicated by superscript 2.

A look-up table may cause distinct amounts of decrease in the Bluetooth power for certain antennas based on the state of other antennas. This is exemplified in Table 6. The Bluetooth power for antennas 136 and/or 146 may be decreased by a lesser amount when the 5 GHz antenna is off (e.g., Wi-Fi connection is off, Wi-Fi network is configured to employ 2.4 GHz) than when the 5 GHz antenna is on. This may be a response to the fact that the antenna 146 can be used to transmit 5 GHz as well as Bluetooth and/or that the antenna 146 that may be close to the antenna 136.

In the disclosed embodiments, reference is made to reductions in the power of transmission. The specific reduction employed may be a function of an SAR calculation or a SPLSR calculation, as discussed above. The reduction in power may be, for example, a reduction by 1 decibel (dB), 3 dB, 5 dB, 7 dB, 9 dB, 15 dB, or 20 dB in the transmission power. The granularity in the management of transmission power discussed above may increase the quality in connection during simultaneous connection to multiple networks, particularly when compared to more conventional methods of scaling back power to other antennas or network connections without considering the impact of the other antennas or network connections on the total radiation emitted or SAR limits. For example, in the group-by-group management illustrated in Tables 2 and 3, the reduction in the transmission power for Wi-Fi operations may reach, on average, 50% of the available antennas. In the antenna-by-antenna management illustrated in Table 4, the reduction in the transmission power for Wi-Fi operation may reach, on average, 72% of the available antennas, and in the antenna-by-antenna management illustrated in Table 5, the reduction in the transmission power for Wi-Fi operations may reach, on average, 87% of the available antennas. The increased antenna availability may reduce the number of dropped packets, increase signal-to-noise ratio, and provide improved bandwidth.

The specific embodiments described above have been shown by way of example, and it should be understood that these embodiments may be susceptible to various modifications and alternative forms. For example, the methods may be applied for embodiments having different numbers and/or locations for antennas, different groupings, and/or different networks. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
   a first group of antennas comprising a first antenna configured to join a first network and a second antenna configured to join a second network, wherein a separation distance between the first antenna and the second antenna is less than a threshold separation distance corresponding to a specific absorption ratio to peak location separation ratio;
   a second group of antennas comprising a third antenna configured to join the second network, wherein a separation distance between the first antenna and the third antenna is greater than the threshold separation distance corresponding to the specific absorption ratio to peak location separation ratio;

control circuitry configured to generate a first message based at least in part on a change to a connection state associated with the first network, the first message indicates a power increase associated with the first group of antennas and the first network; and power control circuitry configured to receive the first message, decrease a transmission power of the second antenna associated with the second network based at least in part on the separation distance between the first antenna and the second antenna being less than the threshold separation distance corresponding to a specific absorption ratio to peak location separation ratio, and not decrease a transmission power of the third antenna associated with the second network based at least in part on the separation distance between the first antenna and the third antenna being greater than the threshold separation distance corresponding to the specific absorption ratio to peak location separation ratio.

2. The electronic device of claim 1, wherein the third antenna is configured to join the first network.

3. The electronic device of claim 2, wherein the control circuitry is configured to generate a second message based at least in part on a second change to the connection state associated with the first network, the second message indicates a power increase associated with the second group of antennas and the first network.

4. The electronic device of claim 3, wherein the power control circuitry is configured to receive the second message, increase the transmission power of the third antenna associated with the first network, and not decrease the transmission power of the second antenna associated with the second network.

5. The electronic device of claim 4, wherein the decrease in the transmission power of the second antenna comprises 1 decibel (dB), 3 dB, 5 dB, 7 dB, or 9 dB.

6. The electronic device of claim 1, wherein the decrease in the transmission power of the second antenna is configured to satisfy a specific absorption ratio (SAR) limitation.

7. The electronic device of claim 1, wherein the first network comprises a cellular network.

8. The electronic device of claim 1, wherein the second network comprises a Bluetooth network or a Wi-Fi network.

9. The electronic device of claim 1, wherein the first network comprises a cellular network, and wherein the second network comprises a Bluetooth network or a Wi-Fi network.

10. The electronic device of claim 1, wherein the control circuitry is configured to generate the first message based at least in part on a look-up table.

11. An electronic device, comprising:
a first antenna and a second antenna associated with a first network;
a third antenna associated with a second network;
control circuitry configured to generate a first message based at least in part on a change to a connection state associated with the first network, the first message indicates an increase in a transmission power of the third antenna associated with the second network; and
power control circuitry configured to, in response to receiving the first message, adjust a transmission power of the first antenna associated with the first network based at least in part on determining that a separation distance between the first antenna and the third antenna is less than a threshold separation distance corresponding to a specific absorption ratio, or adjust a transmission power of the second antenna associated with the first network based at least in part on determining that a separation distance between the second antenna and the third antenna is less than the threshold separation distance corresponding to the specific absorption ratio.

12. The electronic device of claim 11, wherein the first network comprises a Bluetooth network or a Wi-Fi network, and wherein the second network comprises a cellular network.

13. The electronic device of claim 11, the power control circuitry configured to adjust the transmission power of the first antenna based at least in part on a look-up table that is generated based on the separation distance between the first antenna and the third antenna, the transmission power of the first antenna and the transmission power of the third antenna, and the specific absorption ratio.

14. The electronic device of claim 13, wherein the separation distance between the first antenna and the third antenna is less than the threshold separation distance corresponding to the specific absorption ratio, and the look-up table specifies decreasing the transmission power of the first antenna based on the increase in the transmission power of the third antenna.

15. The electronic device of claim 11, wherein the first message conforms to a Wireless Communication Interface 2 (WCI2) protocol with additional bits.

16. The electronic device of claim 11, comprising a fourth antenna and a fifth antenna associated with a third network, the power control circuitry configured to adjust a transmission power of the fourth antenna associated with the third network or adjust a transmission power of the fifth antenna based at least in part on a look-up table.

17. A method to manage transmission power in a multi-radio electronic device comprising a plurality of antennas, comprising:
receiving, at power control circuitry of the multi-radio electronic device, a message that indicates an increase in a first transmission power of a first antenna of the plurality of antennas based at least in part on a change in a connection state;
in response to receiving the message, identifying, in a look-up table in the power control circuitry, a first entry indicative of a reduction in a transmission power of a second antenna of the plurality of antennas that causes superposition radiation of the first antenna and the second antenna to be less than a specific absorption ratio threshold;
in response to receiving the message, identifying, in the look-up table, a second entry indicative of a preservation of a transmission power of a third antenna of the plurality of antennas that preserves superposition radiation of the first antenna and the third antenna to be less than the specific absorption ratio threshold; and
causing the reduction in the transmission power of the second antenna according to the first entry to cause the superposition radiation of the first antenna and the second antenna to be less than the specific absorption ratio threshold while causing the preservation of the transmission power of the third antenna according to the second entry to preserve superposition radiation of the first antenna and the third antenna to be less than the specific absorption ratio threshold.

18. The method of claim 17, wherein the power control circuitry comprises a first power controller associated with the second antenna and configured to store a first portion of the look-up table that comprises the first entry, and a second power controller associated with the third antenna and configured to store a second portion of the look-up table that comprises the second entry.

19. The method of claim 17, wherein the change in the connection state comprises initiation of a call, change in a connection tower, transmission of data, reception of data, or any combination thereof.

20. The method of claim 17, wherein the first antenna is configured to connect to a cellular network, and wherein the second antenna and the third antenna are configured to connect to a Bluetooth network or a Wi-Fi network.

* * * * *